United States Patent
Hanning et al.

(10) Patent No.: US 7,170,758 B1
(45) Date of Patent: Jan. 30, 2007

(54) MODULAR HOUSING INCLUDING SUPPORT RAIL CONNECTING MEANS

(75) Inventors: Walter Hanning, Detmold (DE); Jens Oesterhaus, Detmold (DE)

(73) Assignee: Weidmuller Interface GmbH & Co. KG, Detmold (DE)

( * ) Notice: Subject to any disclaimer, the term of this patent is extended or adjusted under 35 U.S.C. 154(b) by 0 days.

(21) Appl. No.: 11/479,756

(22) Filed: Jun. 30, 2006

(30) Foreign Application Priority Data

Jul. 6, 2005 (DE) ................ 20 2005 010 601 U

(51) Int. Cl.
*H05K 7/14* (2006.01)
*H05K 5/00* (2006.01)

(52) U.S. Cl. .................... 361/801; 361/756; 361/732

(58) Field of Classification Search ............... 361/732, 361/735, 801, 802, 756, 727, 752
See application file for complete search history.

(56) References Cited

U.S. PATENT DOCUMENTS

| | | | |
|---|---|---|---|
| 6,172,875 B1 * | 1/2001 | Suzuki et al. ............... 361/729 |
| 6,322,399 B1 * | 11/2001 | Hanning ..................... 439/717 |
| 6,431,909 B1 * | 8/2002 | Nolden et al. ............... 439/532 |
| 6,478,605 B2 | 11/2002 | Stuckmann | |
| 6,570,769 B1 * | 5/2003 | Royer et al. ................. 361/752 |
| 6,575,771 B2 | 6/2003 | Schnatwinkel | |

* cited by examiner

*Primary Examiner*—Vit Miska
*Assistant Examiner*—Thanh S. Phan
(74) *Attorney, Agent, or Firm*—Lawrence E. Laubscher, Sr.; Lawrence E. Laubscher, Jr.

(57) ABSTRACT

A module connecting arrangement for mounting a module on a support rail includes a horizontal rectangular housing containing a longitudinal chamber, and a bottom surface that contains a recess for transversely receiving the support rail, the recess being in communication with the chamber. A pair of horizontal, superimposed, slidably-connected locking slide members are longitudinally mounted in the chamber. The slide members are spring-biased together toward a locking position in which integral opposed locking lip portions thereon extend below outwardly directed horizontal flange portions of the support rail. A separating member having a non-circular cross-section is rotatably connected with the housing and extends into a gap defined between spaced opposing walls on the slide members, whereby rotation of the separating members produces displacement of the slide members toward released positions relative to the support rail.

13 Claims, 4 Drawing Sheets

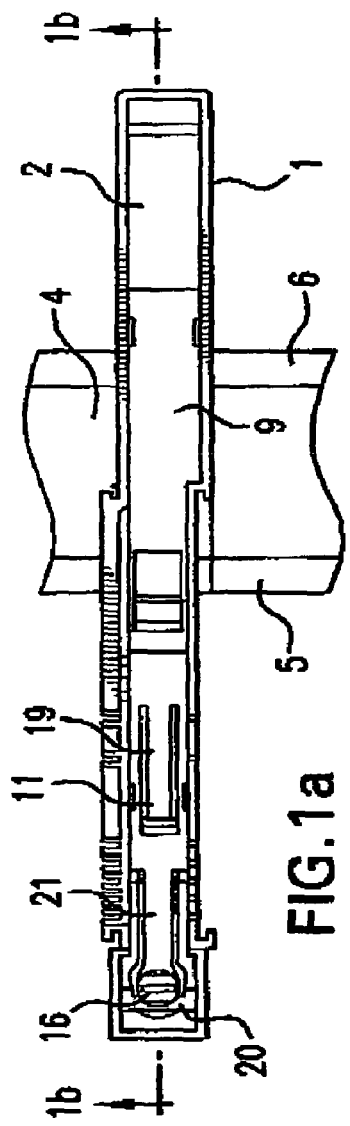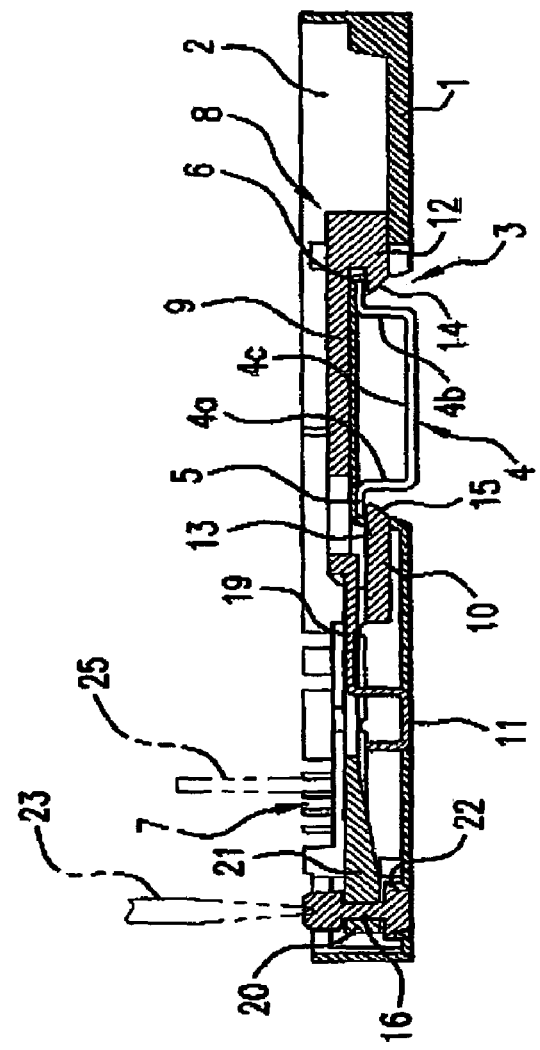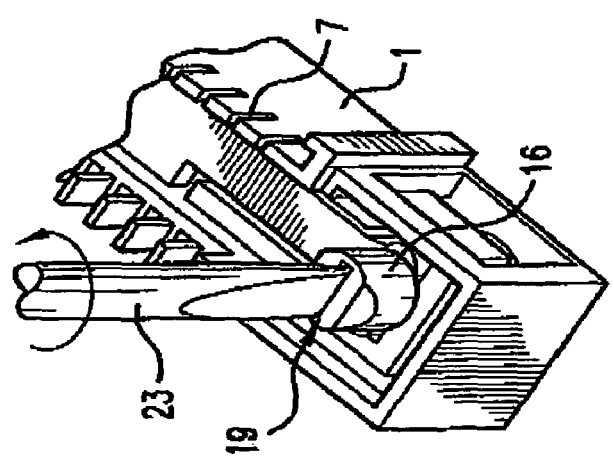

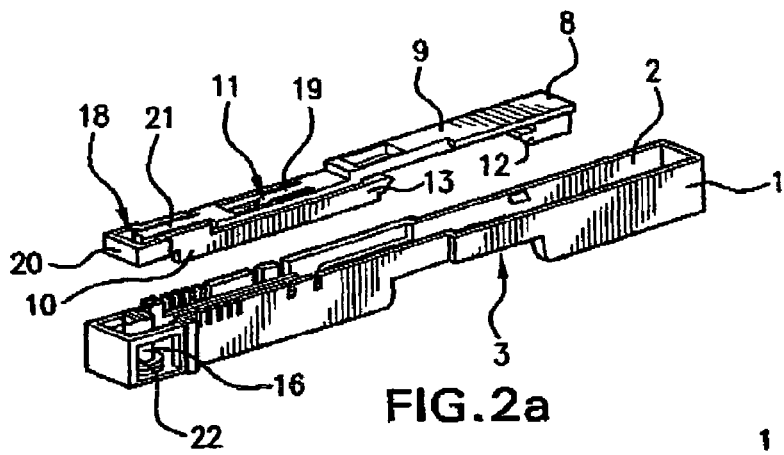
FIG. 2a
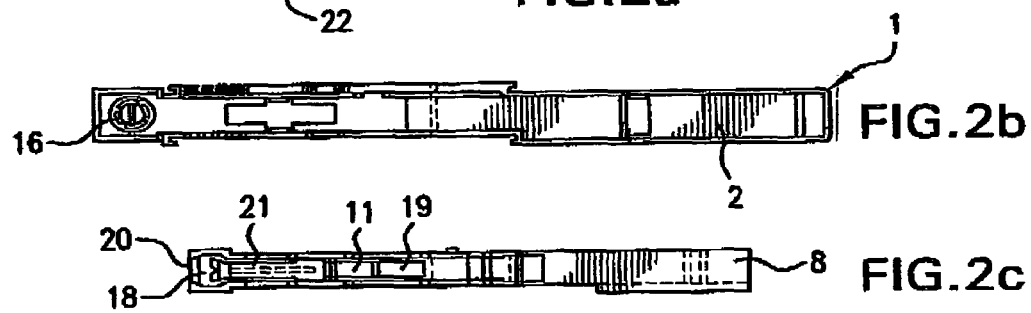
FIG. 2b
FIG. 2c
FIG. 2d
FIG. 2e
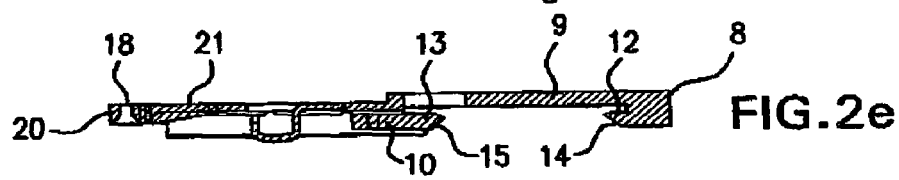
FIG. 2f
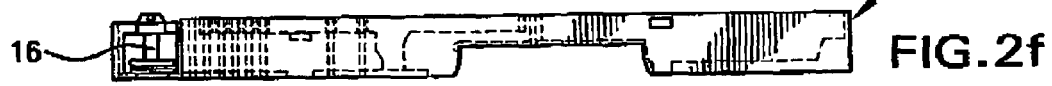
FIG. 2g
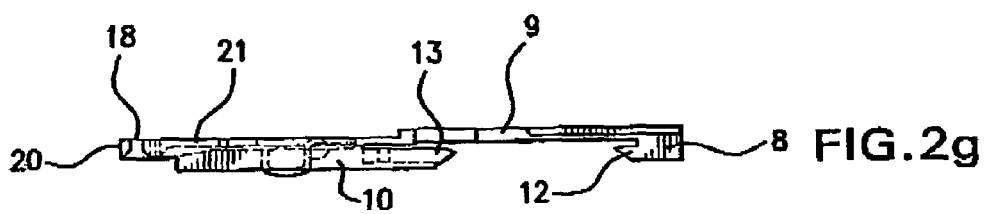

MODULAR HOUSING INCLUDING SUPPORT RAIL CONNECTING MEANS

BACKGROUND OF THE INVENTION

1. Field of the Invention

A module connecting arrangement for mounting a module on a support rail includes a horizontal rectangular housing containing a longitudinal chamber, and a bottom surface that contains a recess for transversely receiving the support rail, the recess being in communication with the chamber. A pair of horizontal, superimposed, slidably-connected locking slide members are longitudinally mounted in the chamber, said slide members being spring-biased together toward a locking position in which integral opposed locking lip portions thereon extend below outwardly directed horizontal flange portions of the support rail. A separating member having a non-circular cross-section is rotatably connected with the housing and extends within a gap defined between spaced opposing vertical walls on the slide members, whereby rotation of the separating member produces displacement of the slide members toward released positions relative to the support rail.

2. Description of Related Art

It is well known to provide electrical modules that are transversely mounted on support rails having a hat-shaped cross section, as shown, for example, by the patents to Hanning U.S. Pat. No. 6,322,399, Stuckmann et al U.S. Pat. No. 6,478,605, and Schnatwinkel et al U.S. Pat. No. 6,575,771. The known modules are in the form of terminal blocks and module bases, and for the purpose of locking the components upon the mounting rail, they have a locking device that is integrated into or set into the housing that consists of electrical insulation material, which locking device grasps behind the laterally extending flange edges of the mounting rail. On the one hand, it is known that one can make the locking device by means of elastic hooks that are injection-molded upon a housing made of electrical insulation material and that, when locked upon the mounting rail, will grasp behind the edge of the mounting rail in a locking manner. Release of the device, for instance, is accomplished with the help of a screwdriver in that one hook is bent away from the mounting rail, whereupon that side of the terminal block can be separated from the mounting rail. However, this procedure presupposes that the hook on the terminal block be accessible, so to speak, out of the direction of the mounting rail (i.e., "from underneath").

Therefore, fastening devices are also known where the separation is done "from above." The known solutions of this type here, however, always entail the disadvantage of a relatively complicated operation and design. Accordingly, it is the object of the invention to provide an improved module housing, in particular, a module base housing, that is characterized by uncomplicated and safe handling and that nevertheless has a simple design structure.

SUMMARY OF THE INVENTION

Accordingly, a primary object of the present invention is to provide a module connecting arrangement in which a rectangular housing is provided containing a longitudinal chamber and having a bottom surface containing a recess for transversely receiving the support rail, a pair of superimposed slidably connected locking slide members being provided in the chamber which are spring-biased together toward a locking position in which opposed locking lips carried thereby extend below outwardly horizontal flange portions of the support rail. A separating member having a non-circular cross-sectional configuration is rotatably connected with the housing and extends in a gap defined between opposed vertical surfaces of the locking slide members, which separating member is rotated by the tip of a screwdriver to separate the slide members longitudinally apart toward a released position relative to the support rail flanges, thereby to permit removal of the module from the support rail.

According to another object of the invention, the rotary spreading member is arranged at one end of the housing remote from the support rail, thereby to permit the selective release of one of a plurality of modules mounted on the support rail.

According to a further object of the invention, the rotary spreading member can be either separate from the housing, or integral with and connected to the housing by a frangible connection.

Another object of the invention is to provide the locking tip portions of the locking slide members with inclined surfaces, thereby to permit mounting of the module by a simple downward displacement of the module relative to the support rail.

The present invention provides a module housing, in particular, a module base housing, for locking upon a mounting rail having mounting rail edges, whereby the housing contains a locking device comprised of two locking slides that can be shifted with relation to each other, that are connected with each other via a spring—preferably in an integral manner—and that in each case have sections for grasping under the edges of the mounting rail, characterized by the provision of a spreading element for spreading the locking slides apart against the force of the spring so as to release the locking device from the mounting rail edges.

The invention is distinguished by a particularly simple and defined handling with low production and assembly costs. For the purpose of mounting on the mounting rail, the housing is locked in a simple manner upon the mounting rail in that, for example, a hook-shaped section behind one of the mounting rail edges is hooked in and that then the module base housing is swung upon the mounting rail. For release, it is only necessary to work on the spreading element with a tool such as a screwdriver.

Preferably, the spreading element comprises a rotatable spreading pin having a non-circular cross-section, i.e., that is flattened over a part of its axial length (in particular, has an elliptical cross-sectional configuration. As a result of the use of a rotatable spread pin, only a quarter rotation of the spreading pin through 90° is necessary to release the fastening device. Then the module base can be taken off the mounting rail in the unlocked condition.

It is practical when the spreading pin is so designed that it can be operated with a tool, in particular, a screwdriver, so that spreading pin has an operating slot for receiving the tip of a screwdriver. It is advantageous that the mounting rail edge can be arranged far to the side so that it can be easily reached.

According to a particular variant, the spreading pin is made as an element that is separate with respect to the housing. As an alternative, it might also be conceived that it is integrally connected with the housing in the area of an intentional break-off point, especially since this variant is particularly easy to make. The spreading pin is separated from the housing after production or during its first use.

It is known from the state of the art that the locking device can be provided with two locking slides that are arranged on both sides of the mounting rail edge and that, for example, are connected with each other by a meander-shaped spring.

The new solution differs from this state of the art in the following manner: It arranges the spreading element, preferably the spreading pin, directly on or in the module base housing, which spreading pin can be operated in a simple and comfortable fashion with a tool in the lock-on direction of the mounting rail or "from above." The invention will be described in greater detail below with reference to the drawing on the basis of the exemplary embodiments.

BRIEF DESCRIPTION OF THE DRAWINGS

Other objects and advantages of the invention will become apparent from a study of the following specification, when viewed in the light of the accompanying drawing, in which:

FIG. 1a is a top plan view of the electrical module connecting means of the present invention when in the locked condition relative to the support rail, and FIG. 1b is a sectional view taken along line 1b—1b of FIG. 1a;

FIG. 1e is a detailed top perspective view of the operating end of the module of FIG. 1b;

FIG. 2a is an exploded perspective view of the module, and FIGS. 2b and 2c are top plan views of the housing and the locking slide member assembly, respectively;

FIGS. 2d and 2e are longitudinal sectional views of the housing and of the locking slide member assembly, respectively;

FIGS. 2f and 2g are side elevation views of the housing and of the locking slide member assembly, respectively, with certain parts broken away:

FIG. 4a is a detailed top plan view of the operating end of the module of FIG. 1b, and FIGS. 4b and 4c are sectional views taken along lines 4b—4b and 4c—4c of FIG. 4a.

DETAILED DESCRIPTION OF THE INVENTION

Figure 1C:
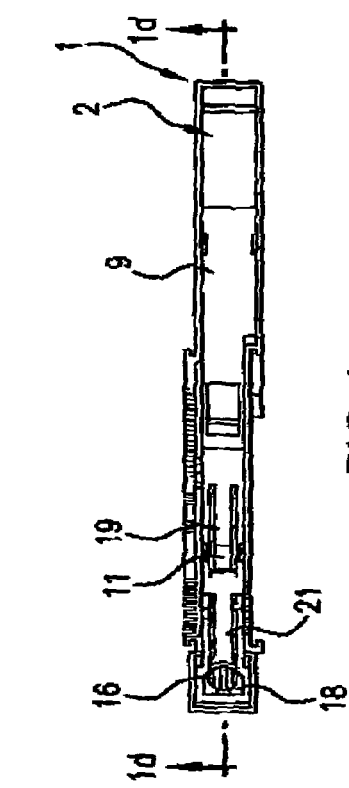
FIG. 1c is a top plan view of the electrical module when in the released condition.

Referring first more particularly to FIGS. 1a–1e, the module connecting means of the present invention includes a generally rectangular frame-like housing 1 containing an upper chamber 2, the bottom wall of the housing containing a recess 3 for transversely receiving the stationary mounting rail 4. As is known in the art, the mounting rail 4 has a generally U-shaped or hat-shaped cross-sectional configuration including a pair of vertical leg portions 4a and 4b that are joined at their lower ends by a horizontal bridging portion 4c. At their upper extremities, the vertical leg portions are provided with laterally outwardly extending horizontal flange portions 5 and 6, respectively.

Mounted within the longitudinally extending chamber 2 are locking means 8 that serve to lock the housing 1 to the support rail 4. More particularly, the locking means 8 includes a pair of parallel superimposed slidably connected locking slide members 9 and 10. The upper slide member 9 extends transversely across the support rail 4 and includes on its lower surface a reversely extending locking lip portion 12 that extends beneath the support rail flange 6. The lower locking slide member 10 includes a locking lip portion 13 that protrudes beneath the horizontal rail flange 5. Spring means 11 serve to bias the slide members 9 and 10 together toward locking engagement with the support rail 4 as shown in FIG. 1b. As will be described in greater detail below, the biasing spring 11 comprises a resilient member that is integral with the upper slide member 9, and which extends downwardly within an opening contained in the lower slide member 10. The lower surfaces of the locking projecting portions 12 and 13 are provided with inclined ramp surfaces 14 and 15, respectively, thereby to permit automatic fastening of the housing 1 to the support rail 4 as will be described in greater detail below. The upper portion of the housing 1 is provided with a plurality of slots 7 for receiving electrical modules such as printed circuit boards 25 or the like, as is known in the art.

In accordance with a characterizing feature of the present invention, a spreading pin 16 is rotatably mounted at its lower end within the housing 1, which spreading pin 16 extends upwardly within a gap 18 defined between opposed vertical wall portions of the slide members 9 and 10. As will be explained in greater detail below, the spreading pin 16 has a central portion of non-circular cross-sectional configuration, whereby upon rotation of the spreading member 16 by a screw driver 23, the slide members 9 and 10 are longitudinally separated toward the released positions of FIGS. 1c and 1d, thereby to permit removal of the housing 1 from the support rail 4.

Referring now to FIGS. 2a–2g, the assembly of the slidably connected locking slide members 9 and 10 is adapted for insertion within the longitudinal chamber 2 contained in the frame-like rectangular housing 1. As shown in FIG. 2a, the biasing spring 11 is integral with the upper slide member 9 and is connected thereto by a bridge portion 19. The U-shaped resilient portion 11 extends downwardly within a corresponding opening contained in the lower slide member 10. Thus, the resilient portion 11 reacts between opposed wall portions of the upper and lower slide members 9 and 10 to bias the slide members together toward the locking position of FIGS. 1a and 1b. At its left-hand end, the assembly is provided with a gap 18 that is defined between the transversed end wall 20 of the lower slide member 10 and the end extremity of the bridge portion 21 of the upper slide member 9. The assembly of the slidably connected locking slide members 9 and 10 is fastened within the housing chamber 2 by cooperating flange and rib means. As shown in FIG. 2d, the recess 13 provided in the bottom wall of the housing 1 is in communication with the housing chamber 2.

Figure 3A:
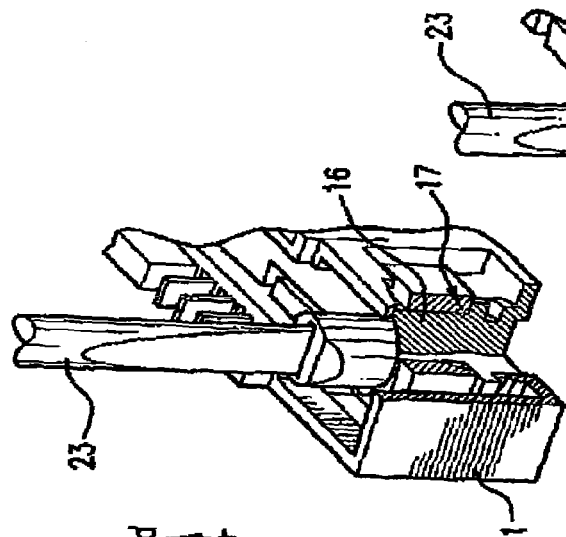
FIGS. 3a and 3b are detailed top perspective views of a modification of the invention wherein the rotatable spreading member is initially integrally connected with the housing by a frangible connection, and after the frangible connection has been broken, respectively.
Figure 3B:
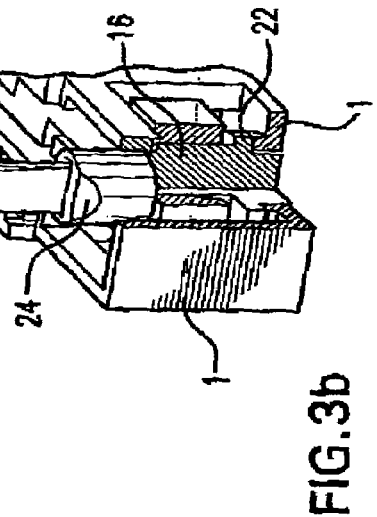
Figure 4A:
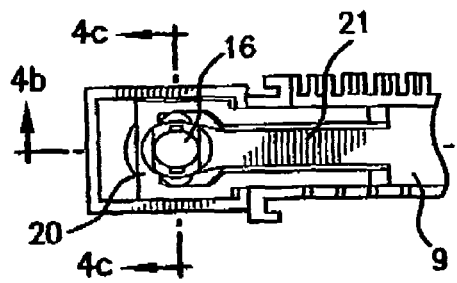
Figure 4B:
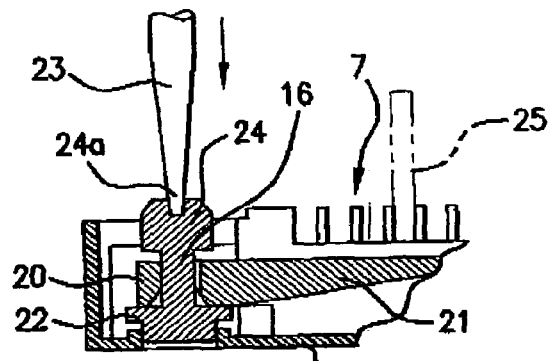
Figure 4C:
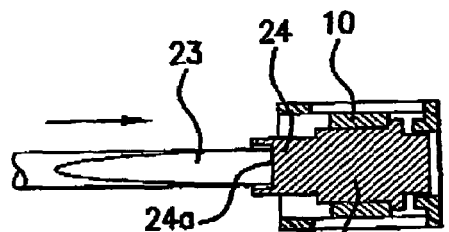
Figure 5A:
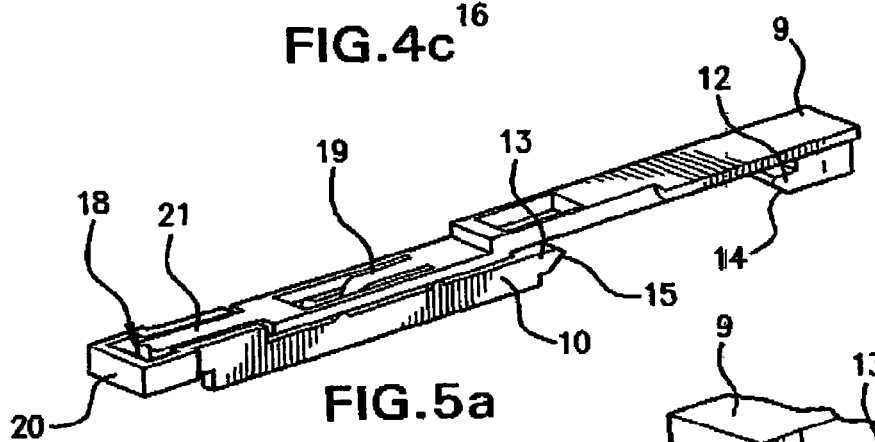
FIGS. 5a and 5b are top perspective and detailed partially sectioned views, respectively, of the locking slide member assembly.
Figure 5B:
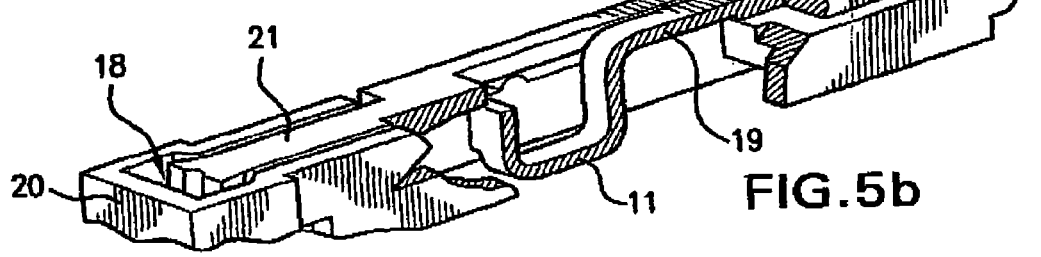

In the embodiment of FIG. 1a to FIG. 2g, the separating pin 16 is a separate element that is rotatably connected at its lower end within a circular opening contained in the bottom wall 1a of the housing 1. The spreading pin 16 is provided at its lower end with an annular support flange 22 that is seated on the bottom wall of the housing 1. In the modification of FIGS. 3a and 3b, the spreading pin 16 is integrally connected with the housing 1 by means of a frangible connection 17. Thus, collar portion 22 of the spreading pin 16 is initially connected with the housing by the frangible connection 17, whereby upon downward displacement of the spreading pin 16 by the application of a force by the tip of a screw driver 23, the frangible connection is broken as shown in FIG. 3b, and the spreading pin 16 is displaced downwardly relative to the housing 1. The lower extremity of the spreading pin then extends within a corresponding circular opening contained in the housing bottom wall 1a, whereby the spreading pin is rotatably connected at its lower end with the housing 1. Referring to FIGS. 4a–4c, it will be seen that the upper end 24 of the rotateable spreading pin 16 is provided with the transverse slot 24a for receiving the operating tip of the screw driver 23.

Operation

In operation, in order to mount the module connecting apparatus of the present invention upon a stationary support rail 4, the housing 1 is displaced downwardly toward the support rail until the inclined bottom surfaces 14 and 15 of the locking projections 12 and 13 engage the lateral flanges 5 and 6 of the support rail. Upon further downward displacement of the housing 1, the slide members 9 and 10 are slightly displaced longitudinally apart so that the locking lips 12 and 13 snap beneath the flange portions 5 and 6. The housing 1 is now locked to the support rail 4, whereupon the various printed circuit boards 25 or other modules are mounted on the housing 1 between the slots 7.

Figure 1D:
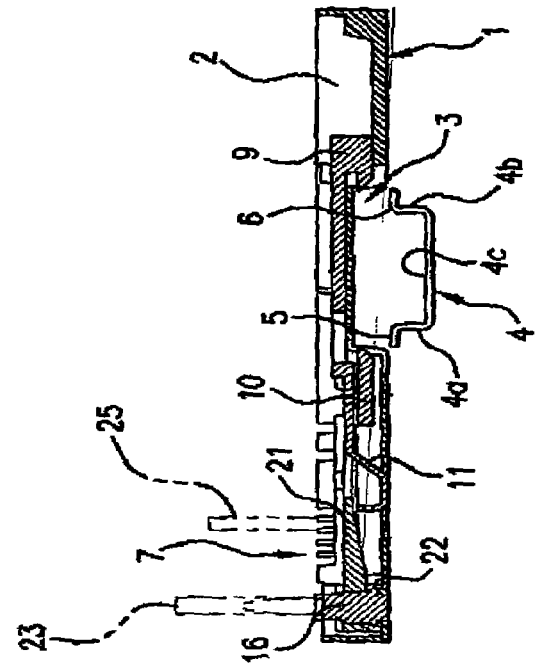
FIG. 1d is a sectional view taken along the line 1d—1d of FIG. 1c.

In order to release the housing 1 from the support rail 4, a screw driver 23 is displaced to cause the tip portion thereof to enter the operating slot 24a, whereupon the spreading pin 16 is rotated through an angle of 90° relative to the housing 1. Owing to the non-circular (preferably elliptical) cross-sectional configuration of the spreading pin, the slide members 9 and 10 are spread apart until the protruding lip portions 12 and 13 are displaced outwardly beyond the horizontal flange portions 5 and 6 of the support rail 4, thereby releasing the housing from the support rail as best shown in FIGS. 1c and 1d. The housing 1 may then be lifted from the support rail 4.

Thus, it will be apparent that one major advantages presented by the present invention is that the slide members 9 and 10 may be separated by a separating pin 16 that is located at the end of the housing 1 remote from the support rail 4, whereby this engagement may be effected independently of the printed circuit boards 25 mounted within the slots 7.

While in accordance with the provisions of the Patent Statutes the preferred forms and embodiments of the invention have been illustrated and described, it will be apparent to those skilled in the art that changes may be made without deviating from the invention described above.

What is claimed is:

1. Module connecting apparatus for releasably mounting an electrical module upon a U-shaped support rail (4) having a pair of upwardly extending leg portions (4a, 4b) joined at their lower ends by a bridging portion (4c), said legs terminating at their upper ends with outwardly extending horizontal flange portions (5,6), respectively, comprising:
    (a) a horizontal generally rectangular housing (1) containing a longitudinal chamber (2), said housing having a bottom surface containing a recess (4) for transversely receiving the support rail, said recess being in communication with said chamber;
    (b) locking means (8) for locking said housing to the support rail when said housing is transversely mounted on the support rail with the support rail extending into said recess, including:
        (1) a pair of horizontal parallel superimposed relatively slidably connected upper and lower locking slide members (9, 10) arranged longitudinally within said housing chamber for relative displacement between adjacent locking and separated release positions relative to said recess, respectively, said lower locking slide member (10) having at one end a protruding locking lip (13) adapted to extend horizontally beneath the adjacent one of the support rail flange portions, said upper locking slide member extending transversely above and across the support rail and including on its bottom surface a reversely extending horizontal locking lip (12) adapted to extend below the other support rail flange portion; and
        (2) spring means (11) biasing said locking slide members longitudinally together toward said locking position, thereby to cause said locking lips to extend beneath said support flange portions, respectively, whereby said housing is locked to the support rail; and
    (c) release means (16) for relatively displacing said locking members in the opposite direction against the biasing force of said spring means toward said released position, thereby to displace said locking lips outwardly from the support rail flange portions, whereby said housing is unlocked for removal from the support rail.

2. Module connecting apparatus as defined in claim 1, wherein said locking slide members cooperate to define a gap (18) having a pair of adjacent vertical longitudinally spaced transverse release surfaces; said release means including a vertical release member (16) rotatably connected with said housing and extending within said gap, said release member including an operating portion having a non-circular cross-sectional configuration arranged between transverse release surfaces.

3. Module connecting apparatus as defined in claim 2, wherein said release member operating portion has a flattened cross-sectional configuration.

4. Module connecting apparatus as defined in claim 3, wherein said release member operating portion has an elliptical cross-sectional configuration.

5. Module connecting apparatus as defined in claim 2, wherein said release member has an upper end containing an operating slot (24a) for receiving the tip of a screwdriver.

6. Module connecting apparatus as defined in claim 2, wherein said release member is independent from said housing.

7. Module connecting apparatus as defined in claim 2, and further including frangible connecting means (17) connecting said separating member with said housing.

8. Module connecting apparatus as defined in claim 7, wherein said separating member has a lower end portion provided with an annular collar portion (22) said frangible connecting means connecting the upper end of said collar with said housing, said frangible connecting means being such that it will be broken upon downward axial displacement of said separating member relative to said housing.

9. Module connecting apparatus as defined in claim 2, wherein said gap is arranged adjacent one end of said housing remote from the support rail.

10. Module connecting apparatus as defined in claim 9, wherein said slide members include interlocking portions that slidably connect said locking slide members.

11. Module connecting apparatus as defined in claim 10, wherein said spring means comprises a resilient U-shaped biasing member (11) having a first leg portion integral with said upper locking slide member, said U-shaped member extending within a slot contained in said lower locking slide members such that the other leg portion of said biasing member reacts with said lower locking slide member.

12. Module connecting means as defined in claim 11, wherein said lower locking slide member includes at one end a frame-like portion (20) containing a recess that cooperates with the adjacent end of said upper locking slide member to define said gap.

13. Module connecting means as defined in claim 12, wherein said locking lips have inclined lower surfaces (14, 15) that cooperate to provide a snap-fit locking connection between said housing and said rail when the disconnected housing is initially displaced downwardly relative to the mounting rail.

* * * * *